United States Patent [19]

Aso et al.

[11] Patent Number: 4,705,932
[45] Date of Patent: Nov. 10, 1987

[54] ELECTRICAL DISCHARGE BORING MACHINE

[75] Inventors: Toshiyuki Aso; Tamotu Tshibashi, both of Hino, Japan

[73] Assignee: Fanuc Ltd., Yamanashi, Japan

[21] Appl. No.: 795,699

[22] PCT Filed: Feb. 15, 1985

[86] PCT No.: PCT/JP85/00063
§ 371 Date: Oct. 11, 1985
§ 102(e) Date: Oct. 11, 1985

[87] PCT Pub. No.: WO85/03657
PCT Pub. Date: Aug. 29, 1985

[30] Foreign Application Priority Data

Feb. 15, 1984 [JP] Japan ............... 59-25202

[51] Int. Cl.$^4$ .............. B23H 1/00; B23H 1/10; B23H 7/30
[52] U.S. Cl. ............... 219/69 V; 219/69 D
[58] Field of Search ........... 219/69 G, 69 U, 69 D, 219/69 W, 69 E; 204/129.5, 129.7

[56] References Cited

U.S. PATENT DOCUMENTS

| | | | |
|---|---|---|---|
| 2,490,302 | 12/1949 | Holfelder | 219/69 V |
| 2,650,979 | 9/1953 | Teubner | 219/69 V |
| 2,807,706 | 9/1957 | Oezer | 219/69 G |
| 3,469,056 | 9/1969 | O'Connor | 219/69 V |
| 3,472,993 | 10/1969 | Gromov et al. | 219/69 D |
| 3,609,279 | 9/1971 | Giesbrecht | 219/69 G |
| 3,688,074 | 8/1972 | Stirner et al. | 219/69 G |
| 3,851,135 | 11/1974 | Moracz | 219/69 D |
| 4,259,562 | 3/1981 | Cammann et al. | 219/69 V |
| 4,387,284 | 6/1983 | Nicholas et al. | 219/69 G |
| 4,423,302 | 12/1983 | Shimiza | 219/69 G |
| 4,476,368 | 10/1984 | Cammann et al. | 219/69 E |
| 4,518,842 | 5/1985 | Obara | 219/69 W |

FOREIGN PATENT DOCUMENTS

| | | | |
|---|---|---|---|
| 57-184633 | 11/1982 | Japan | 219/69 W |
| 59-30625 | 2/1984 | Japan | 219/69 D |
| WO83/00453 | 2/1983 | PCT Int'l. Appl. | 219/69 G |

Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

An electrical discharge boring machine including: a main unit (12) which is moved vertically relative to a workpiece (W); a rotary chuck (14) attached to the lower part of the main unit (12) for holding a hollow bar electrode (16); a guide (36) for slidably guiding the hollow bar electrode (16) near the workpiece (W); a nozzle unit (40) provided on the lower part of the guide for supplying a machining liquid; a rotary joint (28) for introducing the machining liquid into the hollow bar electrode; and a connection (34) for supplying electric power for electrical discharge machining to the hollow bar electrode.

2 Claims, 2 Drawing Figures

ELECTRICAL DISCHARGE BORING MACHINE

DESCRIPTION

1. Technical Field

The present invention relates to an electrical discharge boring machine employing a hollow bar electrode and, more specifically, to an electrical discharge boring machine effectively applicable to boring an initial hole in a workpiece for receiving a wire electrode therethrough for wire electrode type electrical discharge machining by a wire electrode type electrical discharge machine employing a wire electrode.

2. Background Art

When subjecting a workpiece to wire electrode type electrical discharge machining, it is necessary to bore a hole for receiving a wire electrode, namely, an initial hole, in the workpiece at a predetermined position.

A conventional method of forming an initial hole is by drilling a workpiece before hardening or boring a workpiece by an electrical discharge machine employing a well-known solid electrode. The latter method is capable of boring an initial hole in a workpiece even after hardening the workpiece. However, when an initial hole is formed in a workpiece by such a conventional method, the workpiece is removed from the boring machine, and is then mounted on the X-Y table of a wire electrode type electrical discharge machine at a predetermined position, and the initial hole is then aligned with the control unit, and the wire electrode type electrical discharge machining is started. This wire electrode type electrical discharge machining requires complicated preparatory work. Accordingly, it has been desired to develop a simple apparatus capable of achieving both the boring of an initial hole and the wire electrode type electrical discharge machining. Nevertheless, a boring machine meeting such a desire has not yet been proposed.

DISCLOSURE OF THE INVENTION

Accordingly, it is an object of the present invention to provide an electrical discharge boring machine capable of meeting such a desire and applicable to general electrical discharge boring.

The present invention provides an electrical discharge boring machine employing a hollow bar electrode for boring a workpiece through electrical discharge machining, comprising: a main unit capable of being joined to a vertical feed mechanism which moves a unit joined thereto vertically relative to an electrically conductive workpiece, and provided at the lower part thereof with a rotary chuck for holding the hollow bar electrode; a guide holder holding a guide for slidably guiding the hollow bar electrode held by the rotary chuck near the workpiece, a nozzle provided on the lower part of the guide to supply a machining liquid to an electrical discharge machining zone and the lower end of a guide rail for guiding the main unit for vertical feed; detecting means for detecting the limit of vertical feed of the main unit, provided on the main unit so as to engage dog means provided on the guide rail; conductive means provided on the main unit to supply electric power for electrical discharge machining to the hollow bar electrode held by the rotary chuck; and a rotary joint provided within the main unit to introduce the machining liquid into the hollow bar electrode held by the rotary chuck. When this electrical discharge boring machine is joined to the vertical feed mechanism of a wire electrode type electrical discharge machine, the same is able to carry out boring an initial hole effectively.

BEST MODE FOR CARRYING OUT THE INVENTION

Figure 1:
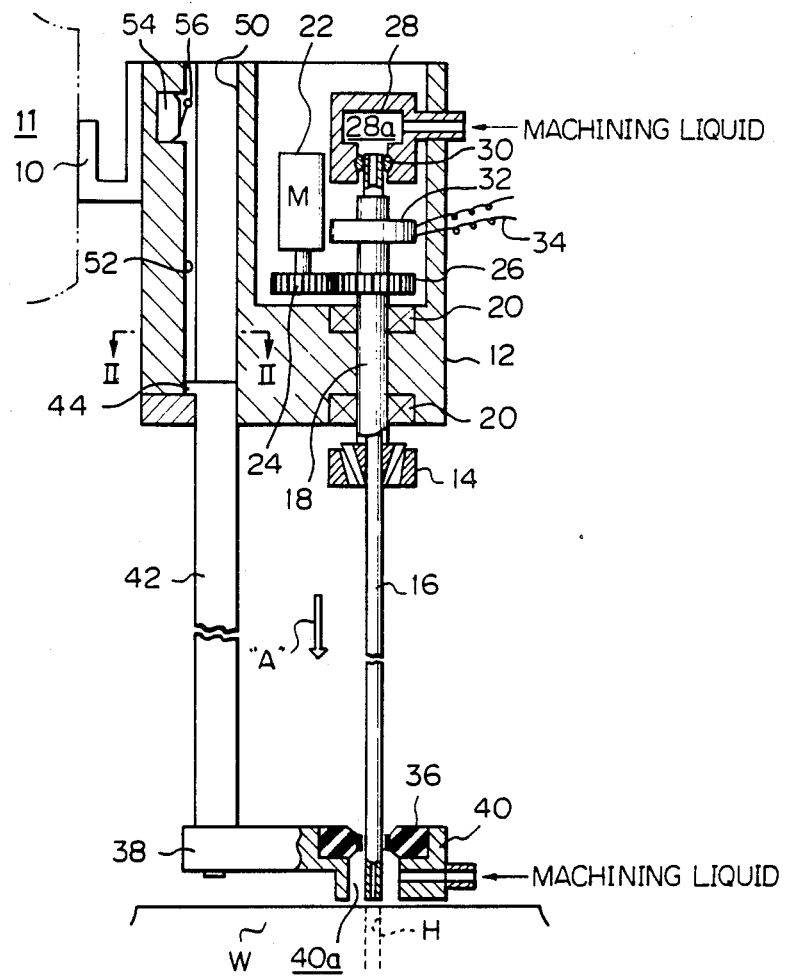
FIG. 1 is a longitudinal sectional view of an electrical discharge boring machine, in a preferred embodiment, according to the present invention, adapted to be joined to a vertical feed mechanism.
Figure 2:
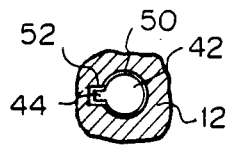
FIG. 2 is a sectional view taken along line II—II of FIG. 1, showing the fit between a guide rail and a groove.

Referring to FIG. 1, an electrical discharge boring machine, in a preferred embodiment, according to the present invention has a main unit 12 which is mounted through an arm or a bracket 10 on a vertical feed mechanism, such as the upper head of a wire electrode type electrical discharge machine 11. A chuck 14 is provided on the lower surface of the main unit 12. A hollow bar electrode 16 is held by the chuck 14 and is rotated together with the rotary shaft 18 of the chuck 14. The rotary shaft 18 is supported rotatably in bearings 20 on the main unit 12 and is rotated through a reduction gear train consisting of a pinion 24 and a gear wheel 26 by a motor 22.

The hollow bar electrode 16 extends through the rotary shaft 18 of the chuck 14 into a rotary joint 28, where a machining liquid is supplied into the hollow bar electrode 16.

The rotary joint 28 is provided with sealing means 30, for example, a well-known O-ring. The machining liquid introduced into the main unit 12 from outside flows through a hollow chamber 28a of the rotary joint 28 into the hollow bar electrode 16 and flows out from the lower end of the hollow bar electrode 16. While flowing through the hollow bar electrode 16, the machining liquid cools the hollow bar electrode 16 from inside. The hollow bar electrode 16 is connected through a commutator 32 provided within the main unit 12 to a power source, not shown, for supplying power for electrical discharge machining. The commutator 32 is connected electrically to the electrical discharge source by conductive wires 34.

On the other hand, a slide guide 36 for steadily guiding the hollow bar electrode 16 for rotation and vertical movement in a direction indicated by an arrow A is held by a guide holder 38 near the lower end of the hollow bar electrode 16, where the hollow bar electrode 16 acts on a workpiece W for electrical discharge machining. The guide holder 38 further has a nozzle unit 40 provided at the lower part of the slide guide 36. The machining liquid is introduced into the nozzle unit 40 from outside to cool the active portion of the hollow bar electrode 16 and its vicinity from outside, to cool the surface of the workpiece W and a hole H, for example, an initial hole, bored in the workpiece W by the hollow bar electrode 16, and to remove powdery dust produced by electrical discharge machining. Furthermore, filling the internal space 40a of the nozzle unit 40 with the liquid suppresses atmospheric discharge from the hollow bar electrode 16 to the workpiece W and induces a smooth start of the electrical discharge at the moment of starting electrical discharge machining, so that roughening of the surface of the workpiece W is prevented. In this embodiment, the nozzle unit 40 is formed integrally with the guide holder 38, however, the nozzle unit 40 may be separate from the guide holder 38 and may be held together with the slide guide 36 by the guide holder 38. Furthermore, at least either the slide guide 36, as shown or the nozzle unit 40 is formed by an insulating material to insulate the guide holder from the hollow bar electrode 16 so that the discharge energy is concentrated between the electrode and the workpiece W.

A guide rail 42 is fixed at the lower end thereof to outer end of the guide holder 38. The guide rail 42 is fitted closely into a slide hole 50 formed in the main unit 12. The main unit 12 is guided by the guide rail 42 for vertical movement when the same moves vertically together with the hollow bar electrode 16. A projection 44 formed at the top of the guide rail 42 engages a groove 52 formed in the slide hole 50 to prevent the turning motion of the main unit 12. The projection 44 functions also as a dog which engages the actuator 56 of a limit switch 54 provided within the main unit 12 to actuate the limit switch 54. The limit of vertical stroke of the hollow bar electrode 16 is detected by the limit switch 54. Naturally, the limit switch 54 provided as detecting means may be disposed within the main unit 12 at an appropriate vertical position corresponding to the stroke with only the actuator 56 thereof disposed within the groove 52. Then, the limit switch 54 is able to detect the limit of the desired stroke in cooperation with the projection 44 formed at the top of the guide rail 42.

As apparent from the foregoing description, the electrical discharge boring machine of the present invention is able to form a hole H in the workpiece W with the hollow bar electrode 16 through electrical discharge machining, when the main unit 120 is fed vertically downward above the workpiece W by an external vertical feed mechanism such as the upper head of a wire electrode type electrical discharge machine 11. During the electrical discharge machining, the guide holder 38 rests on the workpiece and the hollow bar electrode 16 is rotated through the chuck 14 by the rotary driving motor 22 provided in the main unit and is guided steadily without vibration by the slide guide 36, so that the hole H is formed in a precise hole having substantially the same diameter as the desired diameter of the hollow bar electrode 16. Furthermore, the machining liquid is supplied through the interior of the hollow bar electrode and the nozzle unit held by the guide holder to the outer circumference of the electrode and into the hole H of the workpiece W to cool the electrode and the workpiece W. Therefore, thermal deformation of the electrode and the workpiece can be surely prevented, and hence the accuracy of electrical discharge machining for forming the hole is maintained at a high level.

When the electrical discharge boring machine of the present invention is attached to the column of a wire electrode type electrical discharge machine, boring the initial hole in a workpiece and the wire electrode type electrical discharge machining of the workpiece can be achieved through a series of continuous work operations, which improves the operating efficiency of the wire electrode type electrical discharge machine. Naturally, the use of the electrical discharge boring machine of the present invention is not limited to forming an initial hole in a workpiece for the operation of a wire electrode type electrical discharge machining; the electrical discharge boring machine of the present invention is also applicable to a general boring process to form a precise hole having a desired diameter by selectively employing a hollow bar electrode having a desired diameter.

We claim:

1. An electrical discharge boring apparatus for attachment to a wire electrode discharge type electrical discharge machine having a vertical feed mechanism, said boring apparatus comprising:
   a main unit including means for joining said unit to a vertical feed mechanism of a wire electrode discharge type electrical discharge machine to be moved as a unit therewith vertically relative to an electrically conductive workpiece;
   a rotary chuck, driven by a rotary driving motor, provided at a lower part of said main unit for holding a hollow bar electrode, said main unit and hollow bar electrode being moved downwardly by said vertical feed mechanism in performance of an electrical discharge boring operation;
   a rotary joint provided within said main unit to introduce machining liquid into said hollow bar electrode held by said rotary chuck;
   a guide rail slidably fitted to a slide hole formed in said main unit for vertical movement with respect to said main unit;
   a guide holder, fixed to a lower end of said guide rail near said workpiece, including a slide guide for slidably guiding said hollow bar electrode near said workpiece, said guide holder being capable of resting against said workpiece during an electrical discharge boring operation so as to move said guide rail upwardly with respect to said main unit as said main unit and hollow bar electrode move downwardly toward said workpiece; and
   said guide holder being formed with a recessed area at a lower surface thereof below said slide guide to provide an internal space about said hollow bar electrode adjacent said workpiece, said guide holder being formed with nozzle means at a lower part thereof for connection to a source of machining liquid to supply machining liquid to said internal space.

2. An electrical discharge boring apparatus as recited in claim 1, wherein said guide rail is formed with a dog means at an upper end thereof, and a detecting means for detecting a limit of vertical feed of said main unit is provided in said main unit so as to be engaged by said dog means upon said vertical feed mechanism reaching said limit.

* * * * *

UNITED STATES PATENT AND TRADEMARK OFFICE
CERTIFICATE OF CORRECTION

PATENT NO. : 4,705,932

DATED : November 10, 1987

INVENTOR(S) : Toshiyuki ASO et al

It is certified that error appears in the above-identified patent and that said Letters Patent is hereby corrected as shown below:

On the cover page, Item [75], "Tamotu Tshibashi" should read --Tamotu Ishibashi--.

Signed and Sealed this

Twenty-fourth Day of May, 1988

Attest:

DONALD J. QUIGG

*Attesting Officer*      *Commissioner of Patents and Trademarks*